B. H. FRANKLIN.
Hay-Fork.
No. 10,322.
Patented Dec. 20, 1853.
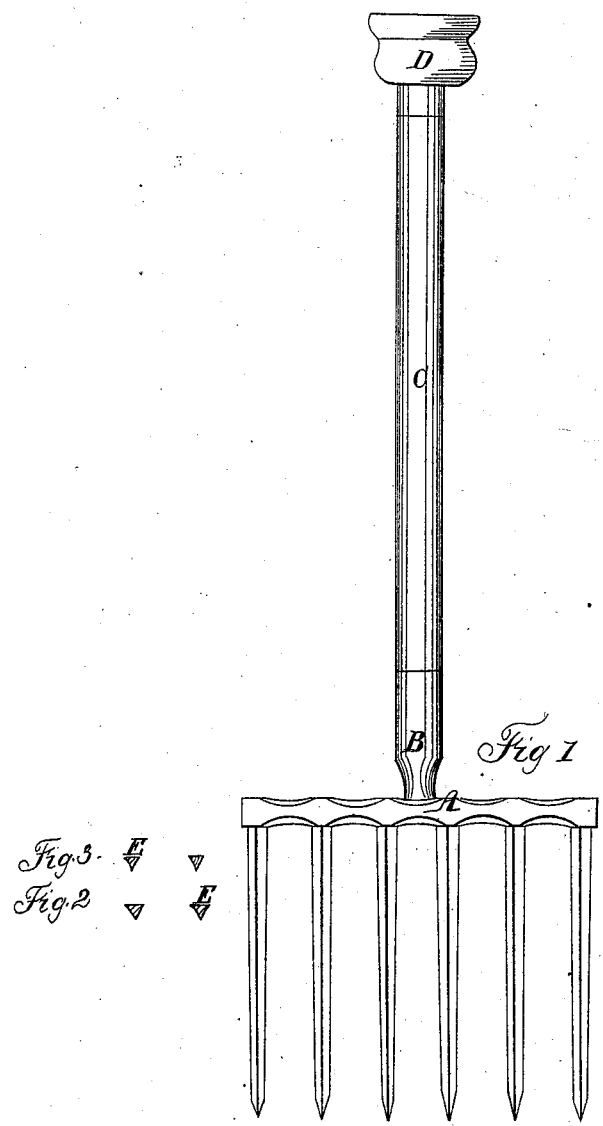

UNITED STATES PATENT OFFICE.

BENJAMIN H. FRANKLIN, OF WORCESTER, MASSACHUSETTS.

IMPROVEMENT IN MANURE AND OTHER FORKS.

Specification forming part of Letters Patent No. 10,322, dated December 20, 1853.

*To all whom it may concern:*

Be it known that I, BENJAMIN H. FRANKLIN, of Worcester, in the county of Worcester and State of Massachusetts, have invented certain new and useful Improvements in the Manner of Constructing Hay, Dung, and other Forks; and I do hereby declare the following to be a full, clear, and exact description of the same, reference being had to the accompanying drawings, making a part thereof, in which—

Figure 1 represents a general outline of one of my forks, and Figs. 2 and 3 cross-sections through the tines.

The nature of my invention consists in making the tines three-sided, and so arranging them in the head or stock as that one of the flat sides shall be on top and the other two receding from the opening between the tines, which gives the fork on top an advantage of holding the material, while anything which slips through between the tines does not stick fast or choke, on account of the widening of the space below.

To enable others skilled in the art to make and use my invention, I will proceed to describe the same with reference to the drawings.

The head or stock A may be made of malleable or wrought metal, and be provided with a ferrule or socket, B, for receiving the handle C. The top of the handle is provided with a metallic scroll, D, for the upper hand, or it may have an opening, or be plain, as may be desired.

The tangs or tines E are three-sided, and said sides may be flat, as seen in the section, Fig. 2, or concave, as seen in Fig. 3, or the top side may be flat and the under sides concave. The shanks of the tines, or that part which is fastened into the head are also three-sided, and the tines are put in separate, and may be replaced at any time when broken by backing out the broken one and riveting in another. The tines taper from heel to point in the usual manner.

The advantages of a three-sided tine over one of four sides or a round one are many, and among them may be enumerated that the depth or strength of the metal is precisely where the most strain comes upon it—viz., perpendicularly and horizontally. They present a flat surface (shovel like) for the material to rest upon. Anything passing between the tines cannot bind or choke, as the space below is wider than on top, and the material will more easily slip or slide off when thrown from the fork. There is less metal, and consequently less weight, while the same degree of strength is preserved. There are but three sides to finish up instead of four. The shank being three-sided, and also the hole into which it is riveted, there is one side less to dress and fit up. With these differences I afford a lighter fork possessing the same strength, more easily relieved from the material upon it, and at a cheaper rate than has heretofore been done.

Having thus fully described the nature of my invention, what I claim therein as new, and desire to secure by Letters Patent, is—

Making the tines of forks three-sided, substantially as herein described, whereby I diminish the weight, retain the strength, improve the holding properties of the fork, and at the same time prevent its choking and cheapen the article.

BENJAMIN H. FRANKLIN.

Witnesses:
JNO. A. DANA,
SAML. P. WALKER.